United States Patent [19]
Livingston

[11] Patent Number: 6,088,107
[45] Date of Patent: Jul. 11, 2000

[54] HIGH RESOLUTION POSITIONER

[75] Inventor: Peter M. Livingston, Palos Verdes Estates, Calif.

[73] Assignee: TRW Inc., Redondo Beach, Calif.

[21] Appl. No.: 09/176,043

[22] Filed: Oct. 20, 1998

[51] Int. Cl.$^7$ .................................................. G01B 11/14
[52] U.S. Cl. .......................................................... 356/375
[58] Field of Search .................................... 356/372, 373, 356/375; 250/559.01, 559.29, 559.3

[56] References Cited

U.S. PATENT DOCUMENTS

| | | | |
|---|---|---|---|
| 3,857,636 | 12/1974 | Angelbeck | 356/106 R |
| 5,286,964 | 2/1994 | Fountain | 250/201.2 |
| 5,763,870 | 6/1998 | Sadler et al. | 250/201.2 |

*Primary Examiner*—Frank G. Font
*Assistant Examiner*—Michael P. Stafira
*Attorney, Agent, or Firm*—Michael S. Yatsko

[57] ABSTRACT

The present invention relates to a high resolution positioner that may be used to measure the lateral displacement between one object, such as a beam compactor, relative to another object, such as a rear cone, which are separated over a moderate distance. The positioner includes a relatively small laser mounted on one of the objects, such as the beam compactor, which is dithered in orthogonal directions creating a Lissajous pattern. The Lissajous pattern is detected by a pinhole detector on a separate object, such as a rear cone. With such a system, displacement of one object, such as a rear cone bench, relative to another object, such as a beam compactor bench, can be relatively accurately determined and used to develop an error signal providing closed loop alignment of the two objects relative to each other.

13 Claims, 2 Drawing Sheets

HIGH RESOLUTION POSITIONER

CROSS-REFERENCE TO RELATED APPLICATIONS

This application is related to commonly owned co-pending application entitled "Multiple Unit Alignment System" by P. Livingston, filed on even date, Ser. No. 09/176,040.

BACKGROUND OF THE INVENTION

1. Field of the Invention

The present invention relates to a high resolution positioner, and more particularly to a system for measuring the lateral displacement of one object with respect to another over a moderate distance.

2. Description of the Prior Art

Various applications are known which require relatively precise alignment between objects. For example, laser weapons are known to require relatively precise alignment of components. More particularly, in order to provide relatively high power in a relatively compact configuration, lasers used as laser weapons have been developed with a cylindrical gain volume and an annular ring resonator. Examples of such lasers are disclosed in U.S. Pat. Nos. 4,598,408; 4,744,090; 4,606,036 and 4,516,214. Such lasers are also discussed in commonly owned co-pending patent application concurrently filed herewith Ser. No. 09/176,040. Such high-powered lasers normally include a conical rear reflector, also known as a rear cone, a waxicon, a reflaxicon, a scraper mirror and a plurality of beam steering mirrors forming a compact leg.

As discussed in the aforementioned commonly owned co-pending patent application, it is important that the various components of the cylindrical laser resonator be relatively precisely aligned. However, alignment of such systems is rather complex and must be relatively precisely controlled in order to avoid significant degradation of performance of the laser. For example, in such an application, the alignment of the rear cone relative to beam compactor must be maintained to an accuracy of microns even though the components are separated by four meters. Failure to maintain relatively precise alignment results in what is known as beam walk, which seriously degrades the performance of the laser.

Previous systems for maintaining the alignment of various components of such lasers, are relatively large, cumbersome and are known to be affected by 1/f noise. Thus, there is a need to provide a relatively simple method for measuring the displacement for a relatively high degree of accuracy for objects, such as a beam compactor and a rear cone, separated by as much as about 4 meters.

SUMMARY OF THE INVENTION

Briefly, the present invention relates to a high resolution positioner that may be used to measure the lateral displacement between one object, such as a beam compactor, relative to another object, such as a rear cone, which are separated over a moderate distance. The positioner includes a relatively small laser mounted on one of the objects, such as the beam compactor, which is dithered in orthogonal directions creating a Lissajous pattern. The Lissajous pattern is detected by a pinhole detector on a separate object, such as a rear cone. With such a system, displacement of one object, such as a rear cone bench, relative to another object, such as a beam compactor bench, can be relatively accurately determined and used to develop an error signal providing closed loop alignment of the two objects relative to each other.

DESCRIPTION OF THE DRAWINGS

These and other advantages of the present invention will be readily understood with reference to the following specification and attached drawing wherein.

DETAILED DESCRIPTION

The present invention relates to high resolution positioner for use in measuring the lateral displacement of one object with respect to another object over a moderate distance. As shown and described below, the high positioner resolution is shown in an application of a cylindrical laser resonator which includes a beam compactor and a rear cone, mounted on a beam compactor bench and a rear bench, respectively, for example, as disclosed in commonly owned co-pending patent application concurrently filed herewith Ser. No. 09/176,040. Even though the system is described in terms of alignment of the beam compactor bench relative to the rear cone bench, it should be understood that the principles of the present invention are basically applicable to measurement of the lateral displacement of any object with respect to another over a moderate distance.

Figure 1:
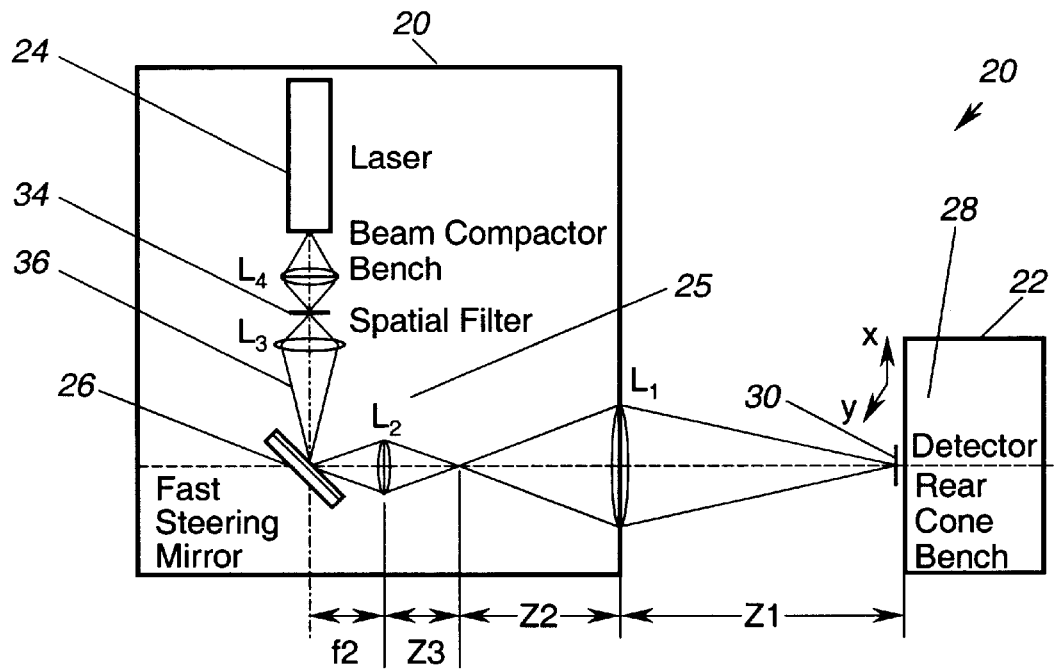
FIG. 1 is an optical schematic of a high resolution positioner in accordance with the present invention.

Referring to FIG. 1, a beam compactor (not shown) is mounted on a beam compactor bench, generally identified with the reference numeral 20, while a rear cone (not shown) is mounted on rear cone bench 22. An important aspect of the invention is the ability to convert the displacement between the two objects to an angle that can measured. As will be discussed in more detail below, the system uses a dither signal which not only provides information relative to the magnitude of the misalignment of one object relative to the other object, but also the direction, thereby allowing closed loop alignment of the two objects.

FIG. 1 illustrates a high resolution positioner 23 in accordance with the present invention. The high resolution positioner 23 includes a laser 24, mounted on the beam compactor bench 20. The laser 24 may be a relatively small laser, such as a diode laser operating visible wavelengths, for example, 660 nm. The high resolution positioner 23 also includes a spatial filter, generally identified with the reference numeral 25, a fast steering or dither mirror 26, a detector 28, mounted on the rear cone bench 22, and a pinhole 30 mounted over the detector 28.

The spatial filter 25 includes a pair of output lenses L3, L4 and a pinhole 34 disposed therebetween. The positioner 23 also includes a pair of lenses L1, L2 disposed between the detector 28 and the dither mirror 26. The lens L1 is disposed at a distance of $Z_1$ from the detector 28 pinhole 30. The lens L2 is disposed at the focal length f2 of the dither mirror 26. As shown in FIG. 1, the lens L1 is disposed at a distance $Z_2$ plus $Z_3$ from the lens L2.

Light from the laser 24 passes through the spatial filter 25 in order to recover a $TEM_{00}$ mode beam at the output of the spatial filter 25. The pinhole 34 is imaged at the point 36, just above the fast steering mirror 26, at the point $Z_2$ behind the lens L1 and again on the pinhole 30 on the rear cone bench 22 when the two objects (i.e. beam compactor bench 20 and the rear cone bench 22) are in alignment. If there is a relative displacement or misalignment of the beam compactor bench 20 relative to the rear cone bench 22, the images will no longer be as discussed above and an error signal is developed by the positioner 23. The error signal results in part from the dithering of the laser signal by the dither mirror 26. More particularly, the dither mirror 26 executes small amplitude sinusoidal excursions in both the X and Y directions forming a Lissajous pattern at the pinhole detector 30. Synchronous detection and integration of the signal at the pinhole detector 30 creates an error signal causing the dither mirror 26 mean angular position to shift, re-centering the two images, forming a first order servo loop which drives any displacement of the beam compactor bench 20 relative to the rear cone bench 22 with the precision primarily determined by the signal-to-noise ratio of the detector 28.

Assuming a unit of resolution $\delta$ to be $2 \times 10^{-4}$ cm and the distance $Z_1 = 400$ cm, the beam diameter at the output lens L1 is given by Equation 1.

$$D = \frac{2\lambda z_1}{\pi n \delta} = \frac{2 \cdot 0.66 \cdot 10^{-4} \cdot 400}{\pi 5 \cdot 2 \cdot 10^{-4}} = 16.81 \text{cm}$$

In order to keep the optics simple, the lens L1 is assumed to have a speed of f/3.5. Therefore, the focal length $f_1$ of the output lens L1 = 58.8 cm. The focal length of the lens L2 is determined by assuming a 1 cm diameter beam filling its pupil to be blown up to the required 16.81 cm. Thus, the focal length for the lens L2 is given by Equation 2, below.

$$f_2 = \frac{f_1}{D} = 3.5 \text{cm}$$

Note, that the optimum position of the fast steering or dither mirror 26 is in the back focal plane of the lens L2 (i.e., 3.5 cm behind it), which minimizes beam walk. From the simple lens formula, the distance $Z_2 = 68.93$ cm.

In order to compute an angle sensitivity, let $\Delta$ be the angle defining the mean position of the dither mirror 26 tracking a displacement $\delta$. The ratio of $\Delta$ to $\delta$ is measured in radians per centimeters, as illustrated in Equation 3 below:

$$\frac{\Delta}{\delta} = \frac{z_2}{z_1 f_2} = \frac{68.93}{400 \cdot 3.5} = 4.923 \text{mrad/cm}$$

For the assumed unit of resolution, the angle is 9.8 microradians, which is well within the capability of the dither mirror 26.

Figure 2:
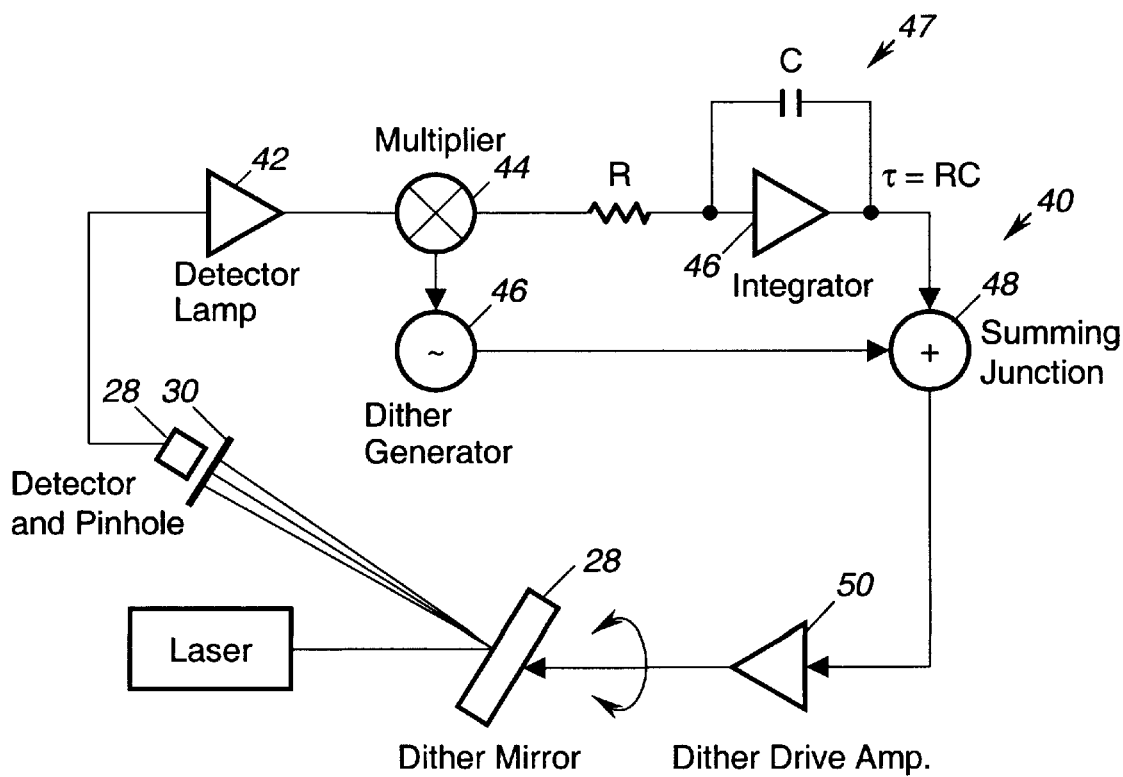
FIG. 2 is a schematic of a servo loop for use in accordance with the present invention.

The servo loop is illustrated in FIG. 2. For simplicity, the servo loop is shown in only a single dimension and is generally identified with the reference numeral 40. The output from the laser 24 is reflected from the dither mirror 26 to the detector 28 to create a time-varying current across a detector load resistor R. The detector signal is amplified by a detector preamplifier 42. Following amplification, the signal, composed of many harmonics of the dither frequency, is multiplied by a sample of the dither generator drive voltage by way of multiplier 44. A sample from a dither generator 46 is also applied to the multiplier 44. When the dither centroid is centered on the pinhole 30, the output signal consists of even harmonics of the dither frequency. Since this signal is integrated by an integrator 47 consisting of an operational amplifier 46 and a capacitor C, the output of the integrator 47, is zero during this condition. If the dither centroid is either high or low, some fundamental frequency will be present at the detector output. As such, multiplying the input signal by a cosine signal from the dither generator 46 creates a quasi-DC signal plus a component at a second harmonic. The integrator 47 during such a condition averages out the harmonic components of the signal preserving the DC component. The sign of the quasi-DC signal depends on whether the dither centroid is above or below the pinhole. As such, during a condition when the dither centroid is not centered on the pinhole 30, the error signal, available at the output of the integrator 47 is summed with the signal from the dither generator 46 at a summing junction 48 which biases the mean angular position of the dither mirror 26 to null out the error signal. The output of the error signal is applied to a drive amp 50, which, in turn, is used to drive the dither mirror 28.

Figure 3:
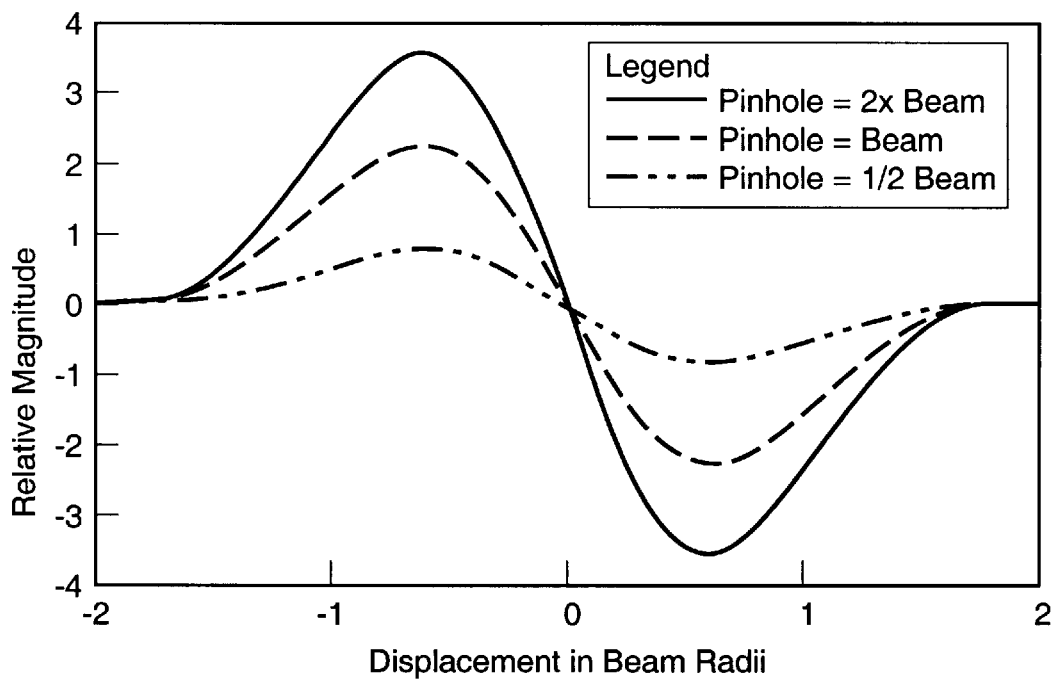
FIG. 3 is a graphical illustration illustrating the error characteristics for three different values pin hole diameter relative to beam spot diameter.

FIG. 3 is a graphical illustration of the error characteristics for three values of pinhole-to-beam radius ratios. In particular, FIG. 3 shows the output of the integrator 47 summed with the dither signal driving the dither mirror 26. Although the vertical scale is arbitrary, the horizontal scale is the beam centroid displacement distance from the pinhole center measured in units of beam radii. The capture range is nearly three beam radii, centered on the pinhole 30. Displacements outside this capture range result in track loss, which in a practical system, will initiate a much larger scan amplitude in a search mode to recapture track.

Figure 4:
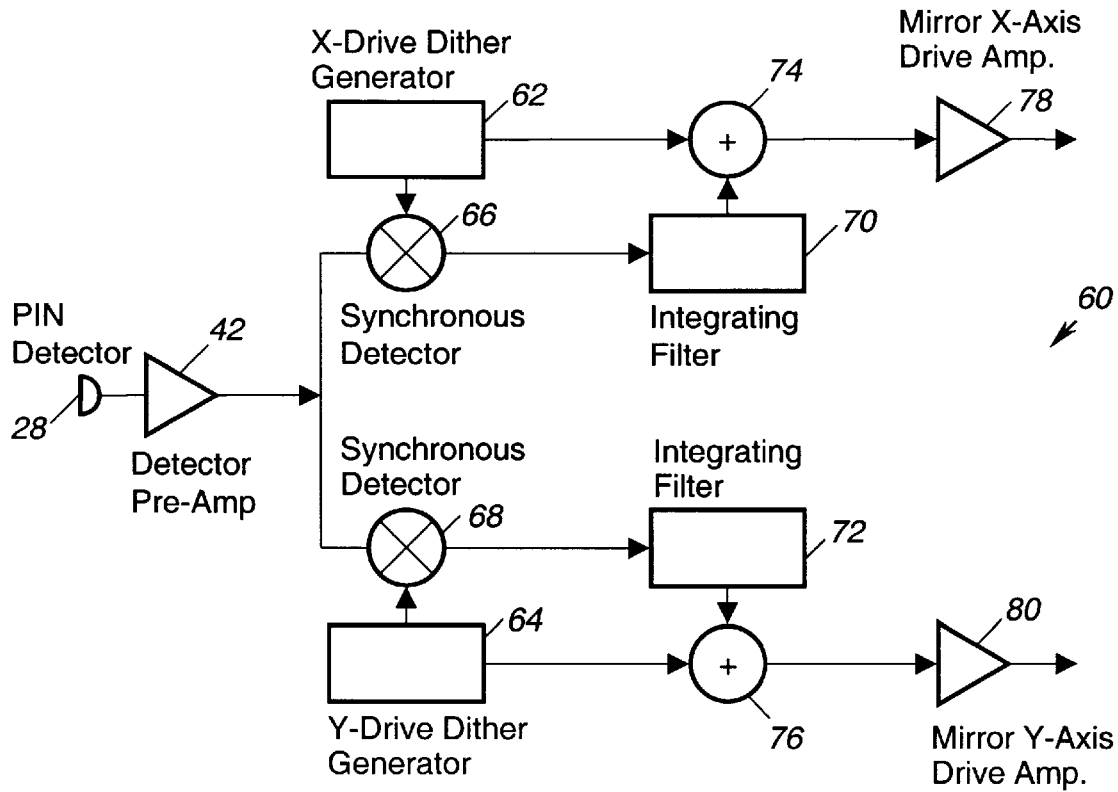
FIG. 4 is a schematic diagram of a mirror controller for use in accordance with the present invention.

FIG. 4 is a schematic of a two-axis system for driving the dither mirror 26, generally identified with the reference numeral 60. The two-axis system 60 includes the detector 28, and a detector preamp 42. The two-axis system 60 also includes an X-drive dither generator 62, as well as a Y-drive dither generator 64 for dithering the dither mirror 26 in orthogonal directions. Signals from the detector preamp 42 are applied to each of the synchronous detectors or multipliers 66 and 68, along with samples from the X and Y dither generators 62 and 64. The output signals from the multipliers 66 and 68 are applied to a pair of integrators 70 and 72, whose outputs are applied to a pair of summers 74 and 76. The output of the summers 74 and 76 drive mirror x-axis drive amp 78 and a y-axis drive amp 80.

Assuming a one percent per surface loss for the optics and 80% transmission loss through the spatial filter 34, let $T_1$ represent the optics losses; $T_{sf}$ represent the insertion loss from the spatial filter; R equal the detector sensitivity expressed in amps/per watt and P represent the laser output power, the signal current for a detector sensitivity, for example of 0.14 amp/watt, a beam diameter equal the pinhole and a 2 miliwatt source, the signal current is provided by Equation 4 below.

$$i_s = T_L T_{SF} R \left(1 - e^{-\frac{d^2}{2r_o^2}}\right) P =$$
$$(0.99)^5 0.8 \cdot 0.14 \cdot (1 - e^{-1}) \cdot 2 \cdot 10^3 = 1.35 \cdot 10^{-4} amps$$

Assuming the mean square shot noise for a shot noise limited signal is the product of a signal current times two, the charge on an electron times the electronic band width—in the case of an RC time constant of the integrator—is given by Equation 5 below.

$$<i_n^2> = 2eBi_2 = 2 \cdot 1.6 \cdot 10^{-19} Bi_X = 3.2 \cdot 10^{-19} \cdot 100 \cdot 1.35 \cdot 10^{-4} = 4.32 \cdot 10^{-21} amps^2$$

The angle jitter relative to the single-to-noise ratio is provided by Equation 6 below.

$$\langle \theta^2 \rangle = \frac{1}{2SNR} = \frac{\langle i_n^2 \rangle}{2i_s^2} = 1.2 \cdot 10^{-13} \text{rad}^2$$

With the assumption as provided above, the RMS error is about 0.3 microradians less than the estimated deflection sensitivity, which scales with the power, i.e., half the power halves the measurement precision. By folding the optics path appropriately, the entire optical unit can be housed in a rectangular box a foot square and eight inches high. Box height scales with the distance over which the alignment is to be accomplished in the laser wavelength. Thus, using a green laser instead of a red laser will reduce the box height by about 20%.

The error signal may be derived by assuming one object to be positioned relative to the object is located in the far-field of the dithered laser beam. A dithered laser beam is made to sweep across the pinhole detector ("the pinhole"). Signals from the detector are relayed to an analog processor consisting of a synchronous detection scheme followed by an integrator and additional filtering, if necessary. The integration of the synchronous detector output produces a signal whose magnitude is proportional to the displacement of the beam centroid from the center of the pinhole amid whose sign depends on which side the pinhole center is located. Therefore, by definition, this "error characteristic" curve, as it is called is an odd function of the displacement. A summing junction precedes the dither mirror amplifier, taking inputs from the dither generator which also operates the synchronous detector, and the integrator. Therefore, a bias (the error characteristic) sums together with the dither signal in such a way that the average position of the mirror is driven to null out the error characteristic signal, hence moving the beam centroid to the center of the pinhole. The error signal required for this thus is a measure of the displacement of the test body from the reference body. Equivalently, these error signals (one each for the x and y displacements) may be used to displace the test body driving the error characteristic to null. In the first case, the device measures the displacement, and in the second, it drives the test body to a null and holds it there.

Under most all circumstances, the far-field spot of a laser beam having a good single $TEM_{00}$ beam profile closely approximates a Gaussian. We assume such with an e-folding radius as given in Equation 7;

$$r_o = \frac{2\lambda}{\pi D},$$

Equation 7 shows the relation between wavelength, aperture diameter and the far-field spot radius for a power P arriving at the pinhole, diameter d.

The displacement of the Gaussian beam from the pinhole center has two components; one is a bias $\delta$ that measures the beam displacement from the pinhole center in units of beam radius, $r_0$; and the other is the AC term with a dither amplitude, $\eta$. Let $\theta = \omega t$ represent the dimensionless dither time given the angular dither frequency $\omega$. Further define the function A as in Equation 8:

$$A = \delta - \eta \cos\theta$$

With these definitions, the total power passed through the pinhole is given y Equation 9:

$$P_t(\theta) = \frac{P}{\pi r_o^2} \int \int_d d^2 \, r e^{-\left(\frac{r}{r_o}+A\right)^2}$$

Next the exponent is expanded and the integration coordinates are transferred to polar coordinates ones. In order to simplify the Fourier-Bessel expansion that follows, the x and y axis definitions are interchanged. Following the transformation, the exponent in expanded carrying the cosine term in a Fourier Bessel series as shown in Equation 10.

$$P_t(\theta) = \frac{Pe^{-A^2}}{\pi r_o^2} \int_0^{2\pi} d\phi \int_0^{d/2} r \, dr \, e^{-\frac{r^2}{r_o^2} - 2\frac{r}{r_o} A\cos\phi} =$$

$$2Pe^{-A^2} \int_0^{d/2r_o} u \, du \, e^{-u^2} I_0\left(2A\frac{r}{r_o}\right)$$

Most of the action is in the exponential and the integral is a scaling factor that is only weakly dependent on A. For A << 1 (the usual case for a servo-system near null) and for a beam comparable to or smaller than the pinhole, we can replace the modified Bessel function with unity and trivialy carry out the remaining integral.

The next step is to expand the exponential shown in a product of Fourier-Bessel expansions as shown in Equation 11:

$$e^{-A^2} = e^{-\delta^2 - \frac{\eta^2}{2}} \sum_m I_m\left(-\frac{\eta^2}{2}\right) \cos m2\theta \sum_n I(2\delta\eta) \cos n\theta$$

After carrying out the integration in Eq. 10, following substitution of 1 for the Bessel function, then replacing the exponential $A^2$ term with Equation 11, the total received power is given by Equation 12:

$$P_t(\theta) = Pe^{-\delta^2 - \frac{\eta^2}{2}} \sum_m I_m\left(-\frac{\eta^2}{2}\right) \cos 2\theta \sum_n I(2\delta\eta) \cos n\theta \left(1 - e^{-\left(\frac{d}{2r_o}\right)^2}\right)$$

The second factor following the product of the sums accounts for power occluded by the pinhole.

A synchronous detection of $P_t$ results in the error characteristic. If $W(\delta)$ represents the error characteristics, then W is the average power P over a dither cycle is given by Equation 13:

$$W(\delta) = -\frac{1}{2\pi} \int_0^{2\pi} d\theta \cos\theta P_t(\theta) = P \cdot \left(1 - e^{-\frac{d^2}{4r_o^2}}\right) e^{-\delta^2 - \frac{\eta^2}{2}}$$

$$\sum_m I_m\left(-\frac{\eta^2}{2}\right) \sum_n I_n(2\delta\eta) \int_0^{2\pi} \frac{d\theta}{2\pi} \cos 2m\theta \cos n\theta \cos\theta$$

Lastly, the integral over the trigonometric functions is resolved using orthogonality of like trigonometric functions over a complete period. The error characteristic is provide by Equation 14:

$$W(\delta) = -\frac{1}{2\pi} \int_0^{2\pi} d\theta \cos\theta P_t(\theta) =$$

-continued $$P \cdot \left(1 - e^{-\frac{d^2}{4r_o^2}}\right) e^{-\delta^2 - \frac{\eta^2}{2}} \sum_{n=1,3,5,\ldots} I_n(2\delta\eta) \left\{ \frac{1}{4} I_{\frac{n+1}{2}}\left(-\frac{\eta^2}{2}\right) + \frac{1}{4} I_{\frac{n+1}{2}}\left(-\frac{\eta^2}{2}\right) \right\}$$

As mentioned above, the pinhole center deviation from the beam centroid is $\delta$, measured in $\tau_0$ units. The modified Bessel function preceding the curly brackets is an odd function of its argument. Therefore, W goes through zero at $\delta=0$ and retains the sign (plus or minus) of the deviation. Hence a first order servo loop control is possible, and in fact, can be made to work to very high precision, limited only by the dither mirror resolution. The exponential containing $\delta$ rolls off the curve for large values of $\delta$ forming a classical sigmoidal curve. The figure below and in the text shows the behavior of W for a 20% dither amplitude and three values of the pinhole to beam spot ratios.

Obviously, many modifications and variations of the present invention are possible in light of the above teachings. Thus, it is to be understood that, within the scope of the appended claims, the invention may be practiced otherwise than as specifically described above.

We claim:

1. A high resolution positioner for aligning a first object relative to a second object, the positioner comprising:
   a laser for generating a laser beam mounted to said first object;
   a dither mirror mounted on said first object in line with said laser beam;
   means coupled to said dither mirror for dithering said laser beam in two orthogonal directions;
   a pinhole detector adapted to be mounted on the second object;
   a spatial filter mounted between said dither mirror and said laser including a pin hole;
   a pair of output lenses disposed between said pinhole detector and said dither mirror; and
   a synchronous detection system for detecting the laser power at said pinhole detector as a function of the alignment of said first and second objects.

2. The high resolution positioner as recited in claim 1, wherein said synchronous detector includes a pair of integrators.

3. The high resolution positioner as recited in claim 2, wherein said dithering means includes an x-drive dither generator and y-drive dither generator.

4. The high resolution positioner as recited in claim 3, where in said synchronous detector includes a pair of multipliers having a pair of inputs and an output.

5. The high resolution positioner as recited in claim 4, wherein signals from said pinhole detectors are applied to one of said multiplier inputs.

6. The high resolution positioner as recited in claim 5, wherein said pinhole detector signals are applied to the other of said multiplier inputs.

7. The high resolution positioner as recited in claim 6, wherein said multiplier outputs are applied to said integrators.

8. The high resolution positioner as recited in claim 7, wherein said synchronous detector includes a pair of summers having two summing inputs.

9. The high resolution positioner as recited in claim 8, wherein output signals from said integrators are applied to one of said summer inputs.

10. The high resolution positioner as recited in claim 9, wherein signals from y-drive dither generator and said y-drive dither generator are applied to the other of said summer inputs.

11. The high resolution positioner as recited in claim 10, wherein said dithering means includes a x-axis drive amp and a y-axis drive amp.

12. The high resolution positioner as recited in claim 11, wherein output signals from said summers are applied to said x-axis and y-axis drive amps.

13. The high resolution positioner as recited in claim 12, further including a detector pre-amp coupled to the output of said pinhole detector.

* * * * *